United States Patent [19]
Whalen

[11] Patent Number: 5,921,397
[45] Date of Patent: *Jul. 13, 1999

[54] DISK CASSETTE

[75] Inventor: Thomas J. Whalen, Minnetrista, Minn.

[73] Assignee: Empak, Inc., Colorado Springs, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/763,042

[22] Filed: Dec. 10, 1996

[51] Int. Cl.$^6$ .................................................. B65D 85/30
[52] U.S. Cl. ........................ 206/711; 206/454; 206/509; 211/41.14
[58] Field of Search ..................................... 206/710–712, 206/303, 454, 508, 509, 511, 821; 211/40, 41.1, 41.14; 118/500

[56] References Cited

U.S. PATENT DOCUMENTS

| | | |
|---|---|---|
| D. 344,891 | 3/1994 | Dressen . |
| 3,826,377 | 7/1974 | Bachmann . |
| 3,926,305 | 12/1975 | Wallestad .................................. 211/41 |
| 4,160,504 | 7/1979 | Kudlich et al. .......................... 206/454 |
| 4,557,382 | 12/1985 | Johnson . |
| 4,572,101 | 2/1986 | Lee . |
| 4,669,612 | 6/1987 | Mortensen . |
| 4,724,963 | 2/1988 | Mortensen ................................ 211/41 |
| 4,779,724 | 10/1988 | Benz et al. ............................... 206/303 |
| 4,779,732 | 10/1988 | Boehm . |
| 5,255,797 | 10/1993 | Kos .......................................... 206/711 |
| 5,348,151 | 9/1994 | Dressen ................................... 206/711 |
| 5,370,142 | 12/1994 | Nishi et al. . |
| 5,472,086 | 12/1995 | Holliday et al. ......................... 206/711 |
| 5,575,394 | 11/1996 | Nyseth ..................................... 206/711 |
| 5,586,658 | 12/1996 | Nyseth ..................................... 206/587 |
| 5,704,494 | 1/1998 | Nishikiori et al. ....................... 206/454 |

*Primary Examiner*—Paul T. Sewell
*Assistant Examiner*—Luan K. Bui
*Attorney, Agent, or Firm*—Nikolai, Mersereau & Dietz, P.A.

[57] ABSTRACT

An improved disk cassette, particularly advantageous for the containment of data storage disks, having a plurality of adjacently disposed rib members, wherein each rib member has an improved cross-sectional profile such that engagement grooves defined therebetween have a dual angle configuration which maintain each disk in radial contact at four different areas along the chamfered periphery thereof to minimize particulation from forming within the disk cassette. More particularly, the improved disk cassette restricts the mobility of the disks and minimizes the amount of contact area between the disks and the disk cassette so as to collectively reduce the propensity for particulation. The improved disk cassette of the present invention is also streamlined in terms of the amount of material required for manufacture, thereby decreasing the cost of materials, the cycle time for curing, and overall cost of manufacture.

8 Claims, 15 Drawing Sheets

DISK CASSETTE

BACKGROUND OF THE INVENTION

I. Field of the Invention

The present invention relates to a container for carrying disk-shaped articles, such as data storage disks, substrate wafers, and the like. More particularly, the present invention relates to an improved disk cassette for data storage disks having a plurality of adjacently disposed rib members, wherein each rib member has an improved cross-sectional profile such that engagement grooves defined therebetween have a dual angle configuration which maintain each data storage disk in radial contact at four different areas along the chamfered periphery thereof to minimize particulation from forming within the disk cassette.

II. Description of the Prior Art

For years, manufacturers have produced special containers for transporting, storing, and processing data storage disks, substrate wafers, and the like. The common denominator with such articles is that they are particularly sensitive to contamination and therefore require extraordinary care when handling to avoid such exposure. Although the containers may be provided with cover members for safeguarding the disks from external impurities, a significant threat of contamination arises within the container itself in the form of airborne particulate which may settle on the disks and cause imperfections. Particulate constitutes subminiature fragments of the material used to manufacture the disk cassette and stems from the abrasion which occurs between the disk cassette and the disks when the disks experience disk tilt within the disk cassette. Main sources of disk tilt include movement of the disk cassette, such as during transportation and handling, as well as thermal expansion of the disks and/or disk cassette, such as during processing.

With regard to data storage disks, particulate has the effect of tainting the data storage medium which results in a reduced ability to store and/or retrieve data. Although several disk cassettes have been specifically designed to accommodate data storage disks during transportation, storage, and processing, these prior art attempts have significant drawbacks which precipitate the need for the present invention. For example, U.S. Pat. No. 4,779,732 to Boehm et al. discloses a disk package for data storage disks including a two-part disk cassette, a top cover, and a bottom cover, wherein each half of the disk cassette has a plurality of rib members. This arrangement is disadvantageous for several reasons. First, the cross-sectional profile of the rib members provides a uni-angular engagement groove defined between the adjacent rib members which permits a considerable degree of disk tilt. Second, the disks must be supported at a plurality of different contact points in both the upper and lower hemisphere in order to compensate for the disk tilt which results from the uni-angular engagement grooves. This has the effect of increasing the contact area between each disk and the disk cassette which, it will be appreciated, increases the likelihood for abrasion and therefore particulation. Requiring rib members in both the upper and lower hemisphere also increases the cost of manufacture, both in terms of the increased amount of material required as well as the increased cycle time for curing which, in turn, limits production.

U.S. Pat. No. 4,557,382, issued to Johnson and assigned to the applicant's assignee, discloses a disk cassette for memory disks having a plurality of parallel rib members defining engagement grooves therebetween. Although generally effective, this disk cassette also has drawbacks from the standpoint of particulate generation and expense of manufacture. With regard to particulation, the cross-sectional profile of the rib members forms a single angle within each engagement groove which, as noted above, causes the data storage disks to experience a fair degree of disk tilt during transportation and handling. In this same regard, a relatively large contact area exists within each engagement groove which also increases the opportunity for abrasion and thus particulation. With regard to manufacturing costs, the disk cassette requires a relatively large amount of material which translates into increased costs for materials, as well as increased cycle time for curing which, as noted above, limits the number of disk cassettes which can be produced within a given period.

A need therefore exists for an improved disk cassette which solves the aforementioned problems with the disk cassettes disclosed in the prior art. In particular, an improved disk cassette is needed which restricts the mobility of the disks within the disk cassette so as to reduce abrasion and, hence, particulation. A need also exists for an improved disk cassette which boasts minimal contact area between each disk and the disk cassette so as to reduce the propensity for particulation. A need also exists for an improved disk cassette which is streamlined in terms of the amount of material required for manufacture, thereby decreasing the cost of materials, the cycle time for curing, and overall cost of manufacture.

OBJECTS AND SUMMARY OF THE INVENTION

It is a principle object of the present invention to provide an improved disk cassette for use in transporting, storing, and processing data storage disks or other disk-shaped articles.

It is another principal object of the present invention to provide an improved disk cassette which helps prevent the generation of particulation which can contaminate or damage the memory media on data storage disks, or contaminate or damage other disk-shaped articles.

It is a still further object of the present invention to provide an improved disk cassette which restricts the mobility of the disks within the disk cassette so as to reduce the occurrence of abrasion therebetween.

It is yet another object of the present invention to provide an improved disk cassette which minimizes the area of contact between each disk and the disk cassette so as to reduce the opportunity for abrasion.

It is still a further object of the present invention to provide an improved disk cassette which requires a minimal amount of material for formation, thereby decreasing the cost of manufacture and cycle time.

In accordance with a broad aspect of the present invention, the aforementioned objects are accomplished by providing an improved disk cassette for carrying a plurality of disk-shaped articles, such as data storage disks, comprising a first end wall disposed opposite a second end wall, a first lateral support wall disposed opposite a second lateral support wall, and a disk containment portion disposed between the first and second end walls. The disk containment portion includes opposing side walls, wherein each of the opposing side walls includes a plurality of rib members disposed in parallel relation along an interior surface of each of the opposing side walls. Each of the plurality of rib members have an upper surface extending between a pair of lateral surfaces. Each of the pair of lateral surfaces include a lower angular surface extending at a first predetermined angle, and an upper angular surface extending between the lower angular surface and the upper surface at a second predetermined angle.

In accordance with yet another broad aspect of the present invention, an improved disk cassette is provided for carrying a plurality of data storage disks, wherein each of the data storage disks has a principal peripheral edge and opposing chamfered peripheral edges extending from the principal peripheral edge at a predetermined chamfer angle. The improved disk cassette comprises a disk containment portion having a plurality of parallel rib members forming a plurality of engagement grooves therebetween. Each of the plurality of rib members have opposing first angled surfaces extending at a first predetermined angle and opposing second angled surfaces extending at a second predetermined angle. The plurality of rib members are disposed within the disk containment portion such that the opposing chamfered peripheral edges of each of the plurality of data storage disks contact the opposing first angled surfaces in flush and radial fashion along a predetermined engagement portion within each of the plurality of engagement grooves.

In yet another broad aspect of the present invention, an improved disk cassette for carrying disk-shaped articles is provided, comprising opposing side walls having a plurality of opposing engagement grooves formed therein. Each of the plurality of opposing engagement grooves includes a first angled portion and a second angled portion. The first angled portion is adapted to receive a peripheral edge of a disk-shaped article in radial contact. The second angled portion extends from the first angled portion at a lesser included angle than the first angled portion so as to restrain the disk-shaped article from tilting.

BRIEF DESCRIPTION OF THE DRAWINGS

These and other objects of the invention will become more readily apparent from the following detailed description taken in conjunction with the accompanying drawings in which.

DETAILED DESCRIPTION OF THE PREFERRED EMBODIMENT

Figure 1:
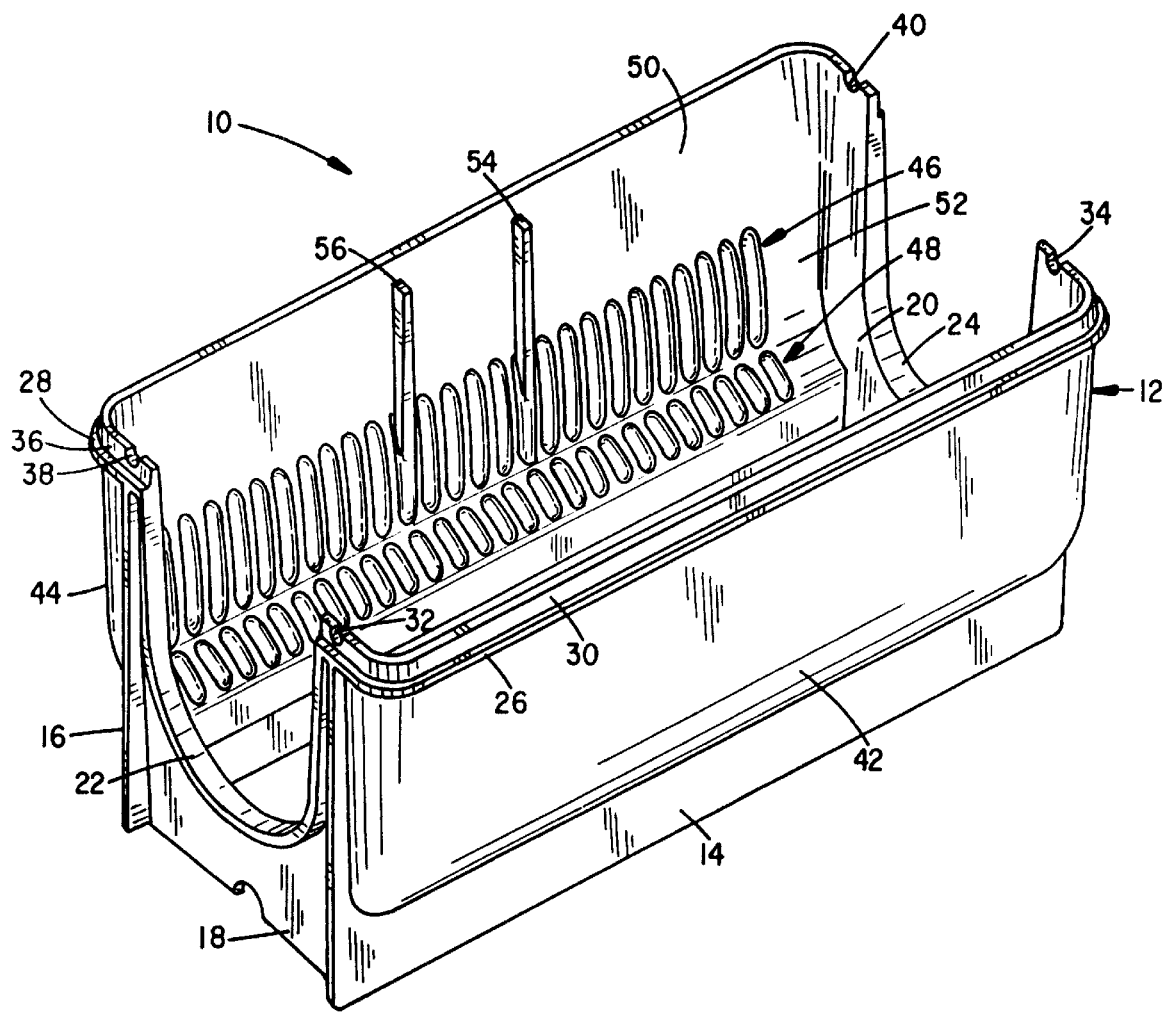
FIG. 1 is a perspective view of the improved disk cassette of a preferred embodiment of the present invention.
Figure 2:
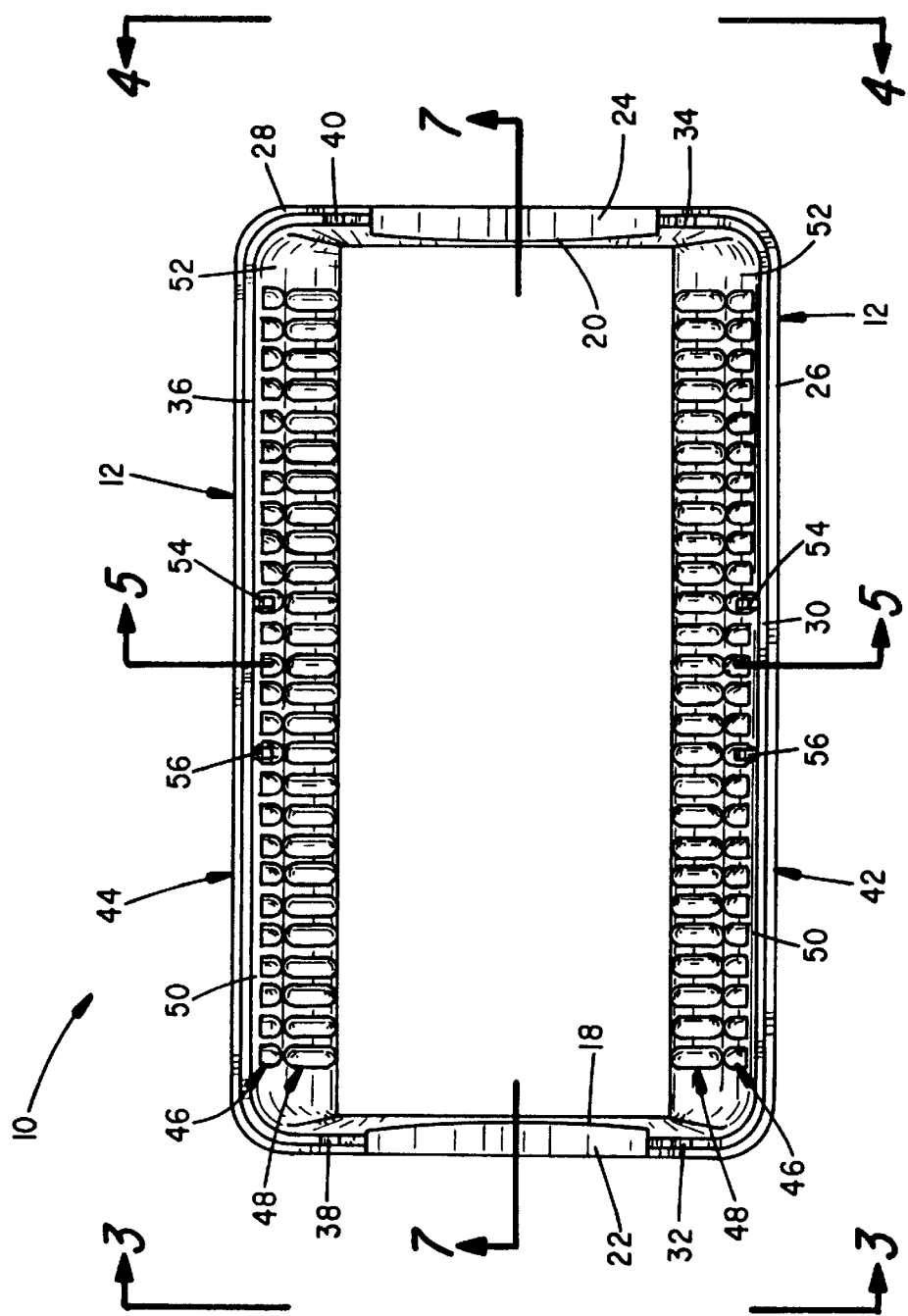
FIG. 2 is a top view of the improved disk cassette shown in perspective in FIG. 1.
Figure 3:
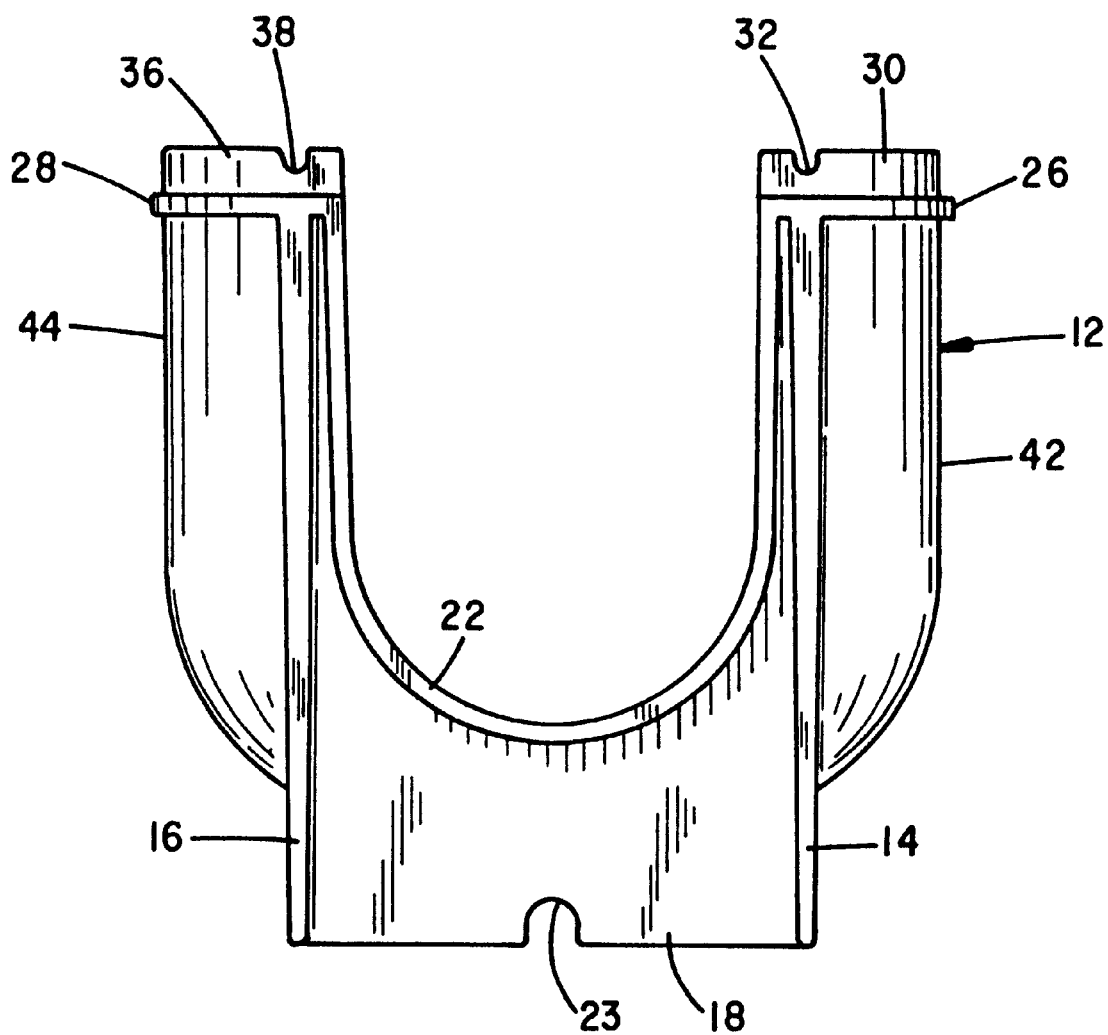
FIG. 3 is a first end view of the improved disk cassette of a preferred embodiment of the present invention taken along lines 3—3 in FIG. 2.
Figure 4:
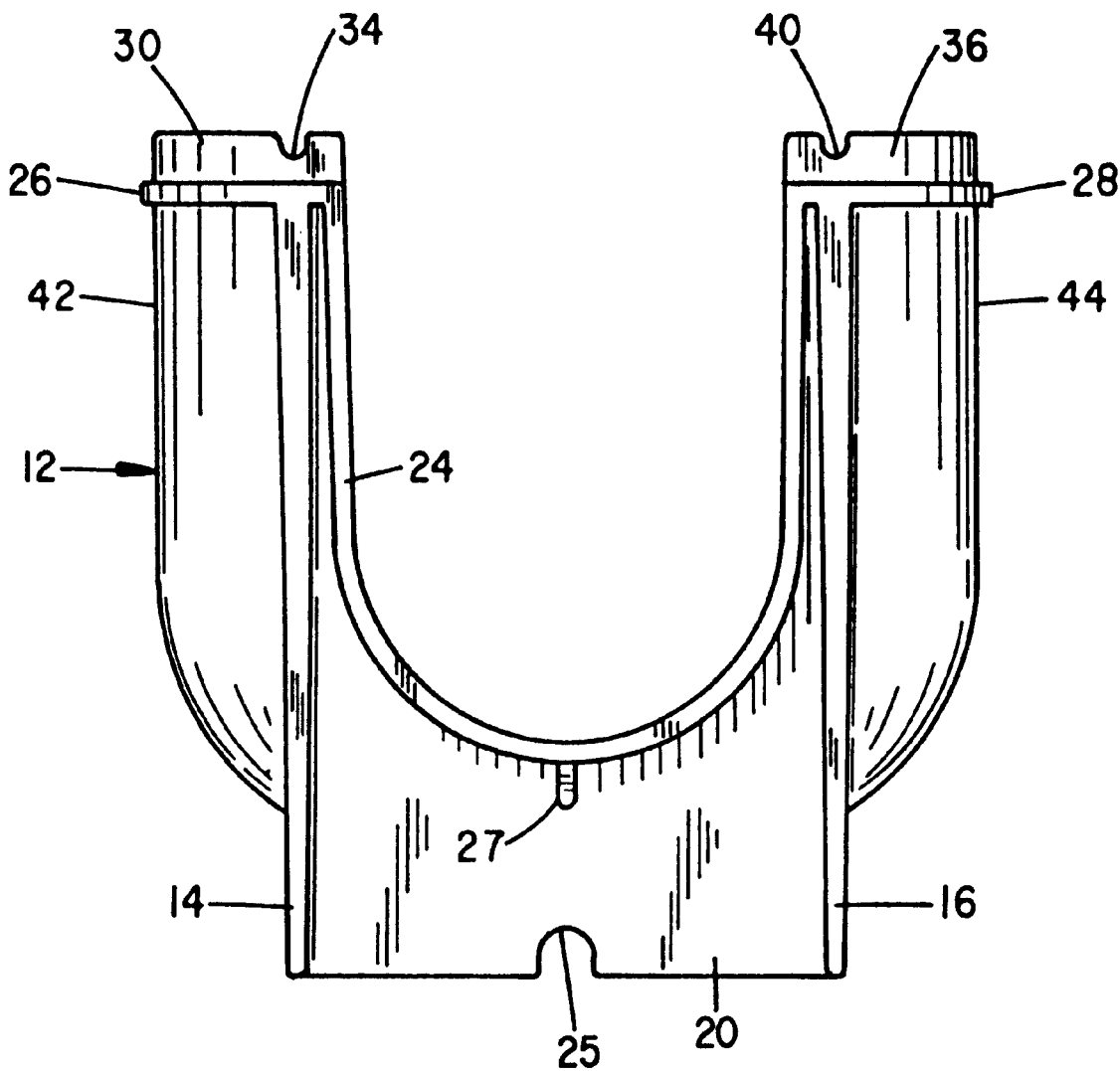
FIG. 4 is a second end view of the improved disk cassette of a preferred embodiment of the present invention taken along lines 4—4 in FIG. 2.
Figure 5:
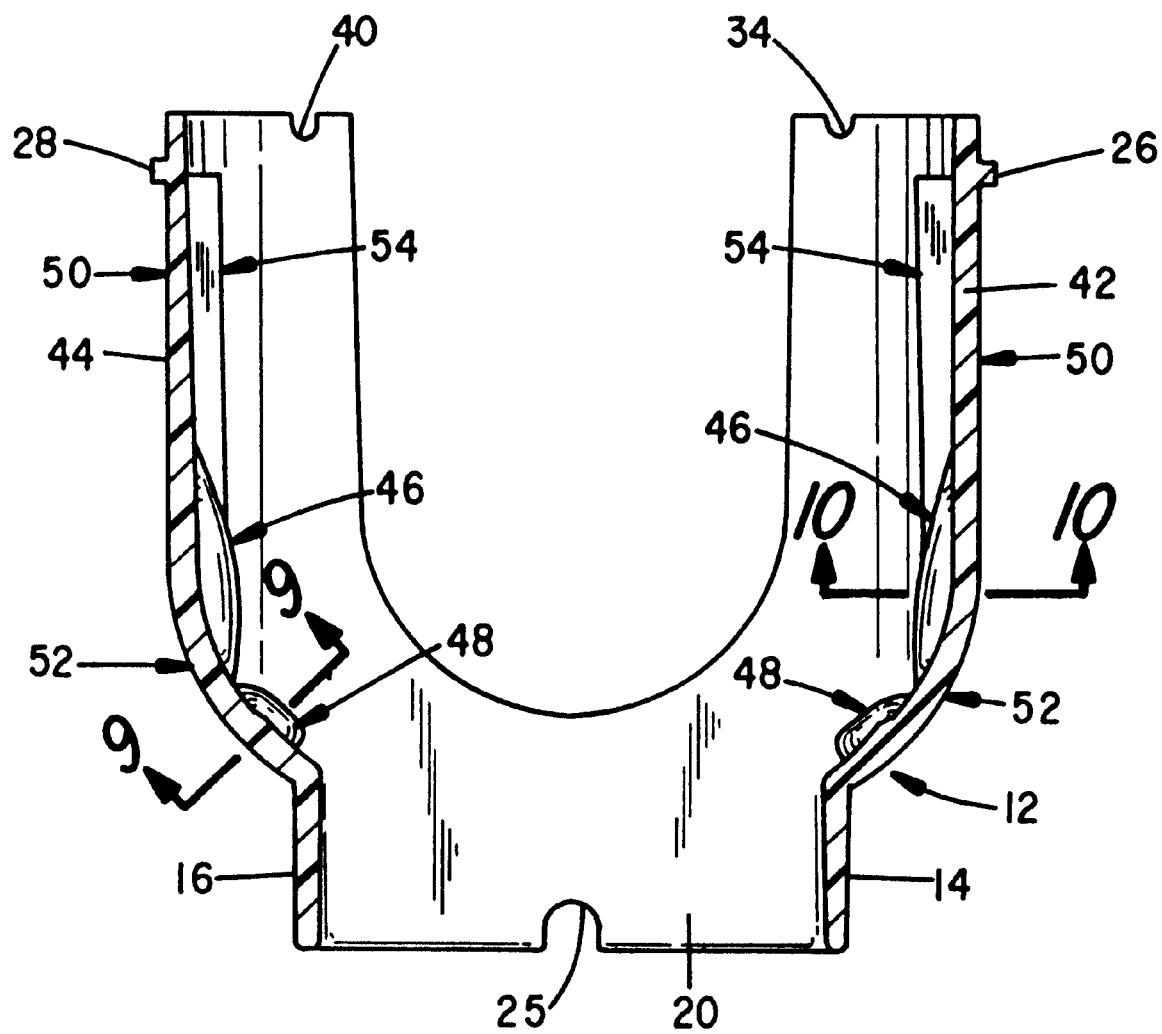
FIG. 5 is a cross-sectional view of the improved disk cassette of a preferred embodiment of the present invention taken along lines 5—5 in FIG. 2
Figure 6:
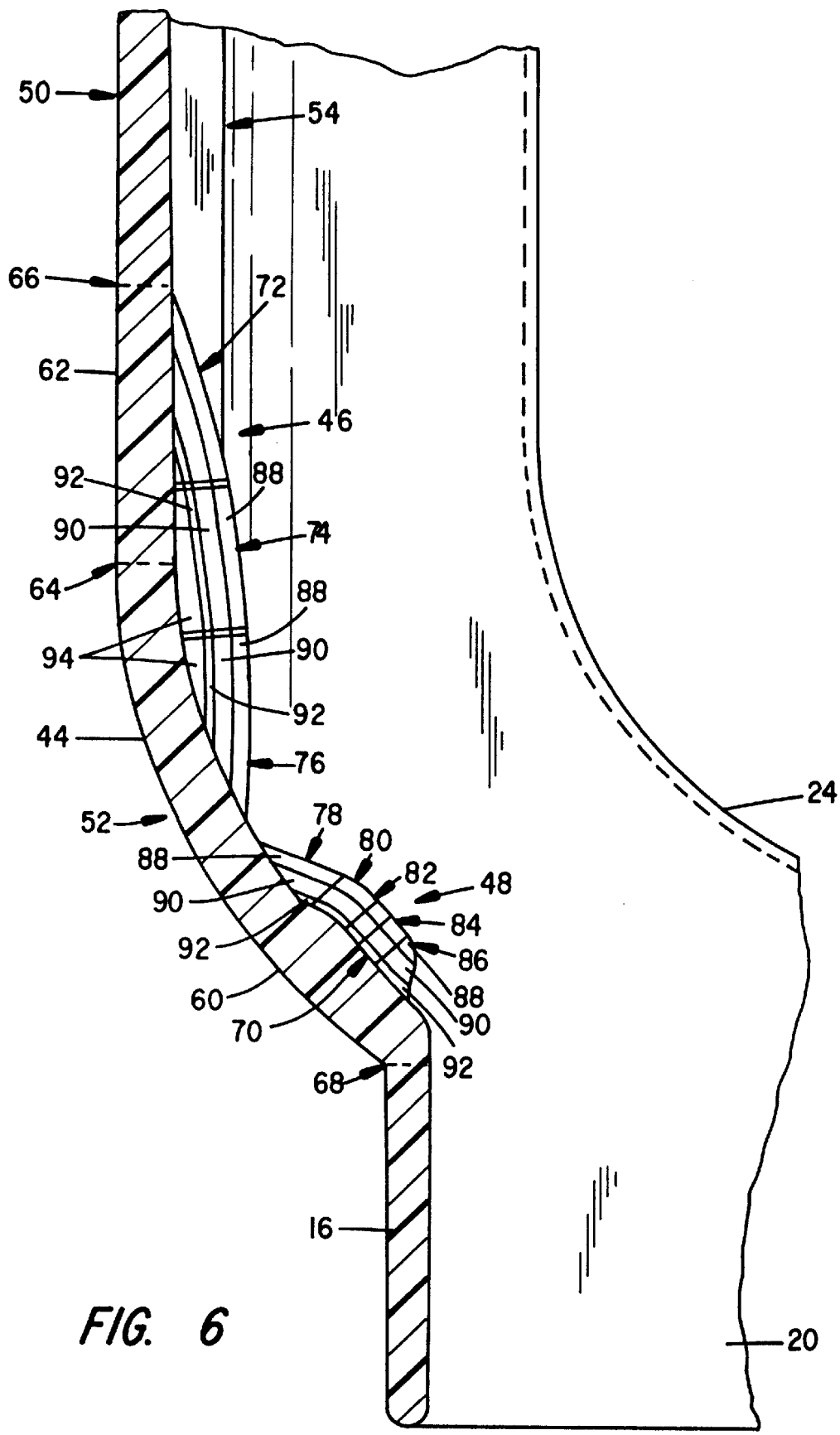
FIG. 6 is an enlarged view of a portion of the cross-sectional view shown in FIG. 5, further illustrating the construction of the upper and lower rib members in accordance with a preferred embodiment of the present invention.
Figure 7:
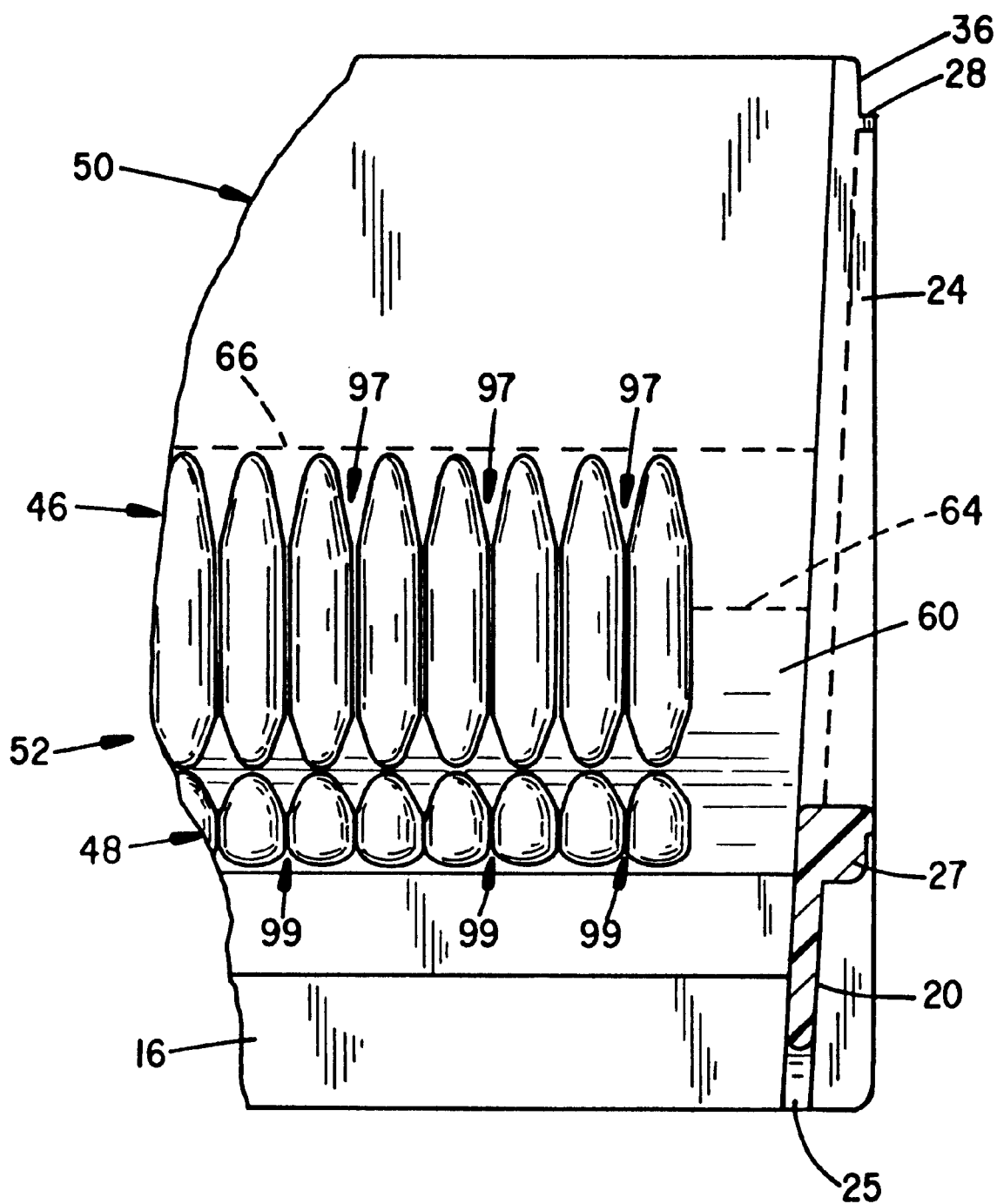
FIG. 7 is a cross-sectional view of a portion of the improved disk cassette of a preferred embodiment of the present invention taken along lines 7—7 in FIG. 2.
Figure 8:
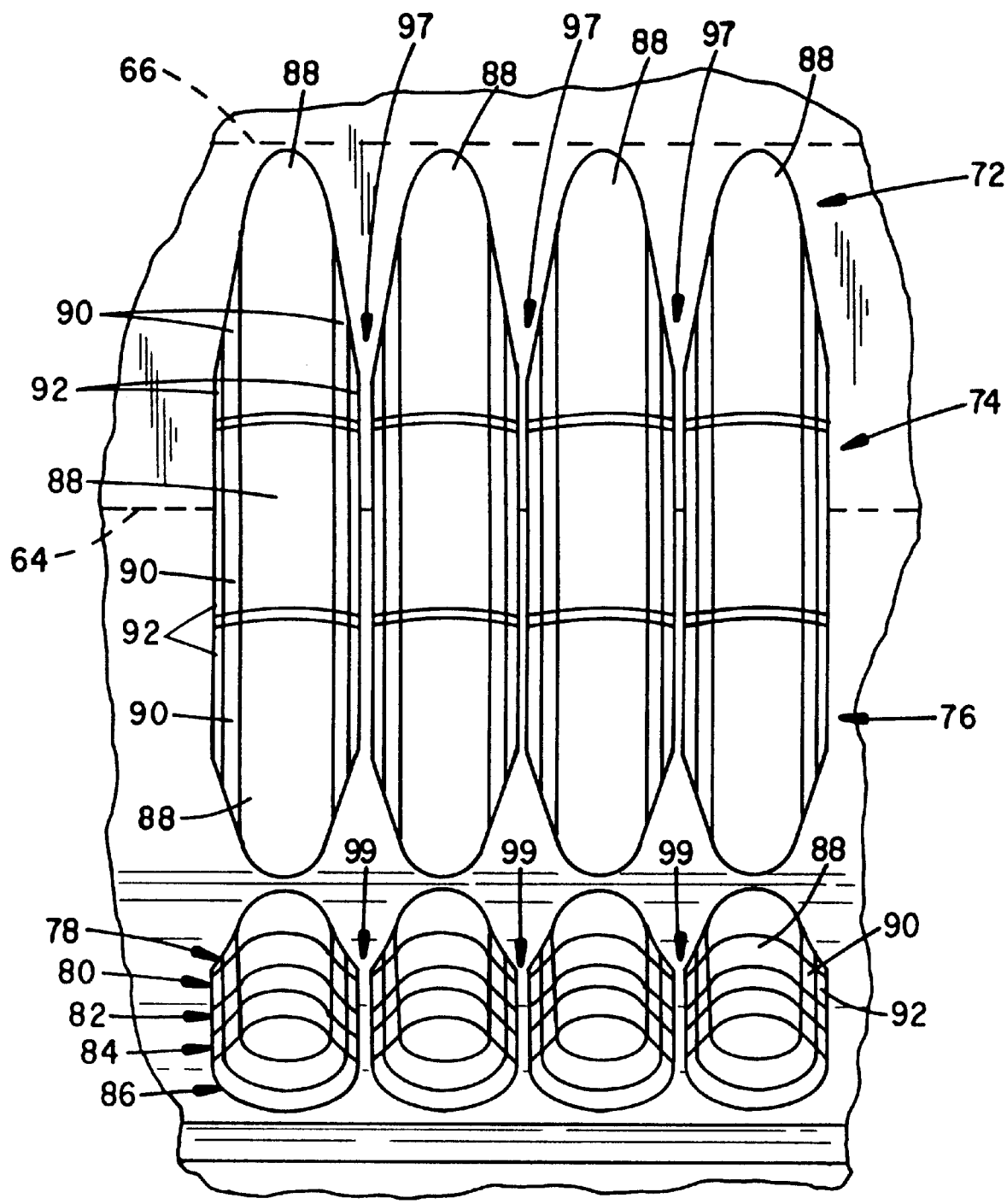
FIG. 8 is an enlarged view of the upper and lower rib members shown in FIG. 7.

Referring initially to FIG. 1, illustrated in perspective is an improved disk cassette 10 constructed in accordance with a preferred embodiment of the present invention. Broadly speaking, the improved disk cassette 10 includes a disk containment portion 12, a first lateral support wall 14, a second lateral support wall 16, a first end wall 18, and a second end wall 20. The disk containment portion 12 may be semi-cylindrical in shape and, as will be described in greater detail below, is specifically configured to carry a plurality of disk-shaped articles, such as data storage disks for computer applications, such that minimal particulation occurs during the transportation, storage, and/or processing of the disks. By way of overview, the disk containment portion 12 accomplishes this reduction in particulation by restricting the mobility of each disk while disposed within the disk cassette 10, as well as minimizing the area of contact between each disk and the disk cassette 10. The disk containment portion 12 may also be streamlined in terms of the amount of material required to accomplish the reduction in particulation, thereby advantageously reducing the cost of manufacturing each disk cassette 10.

Figure 15:
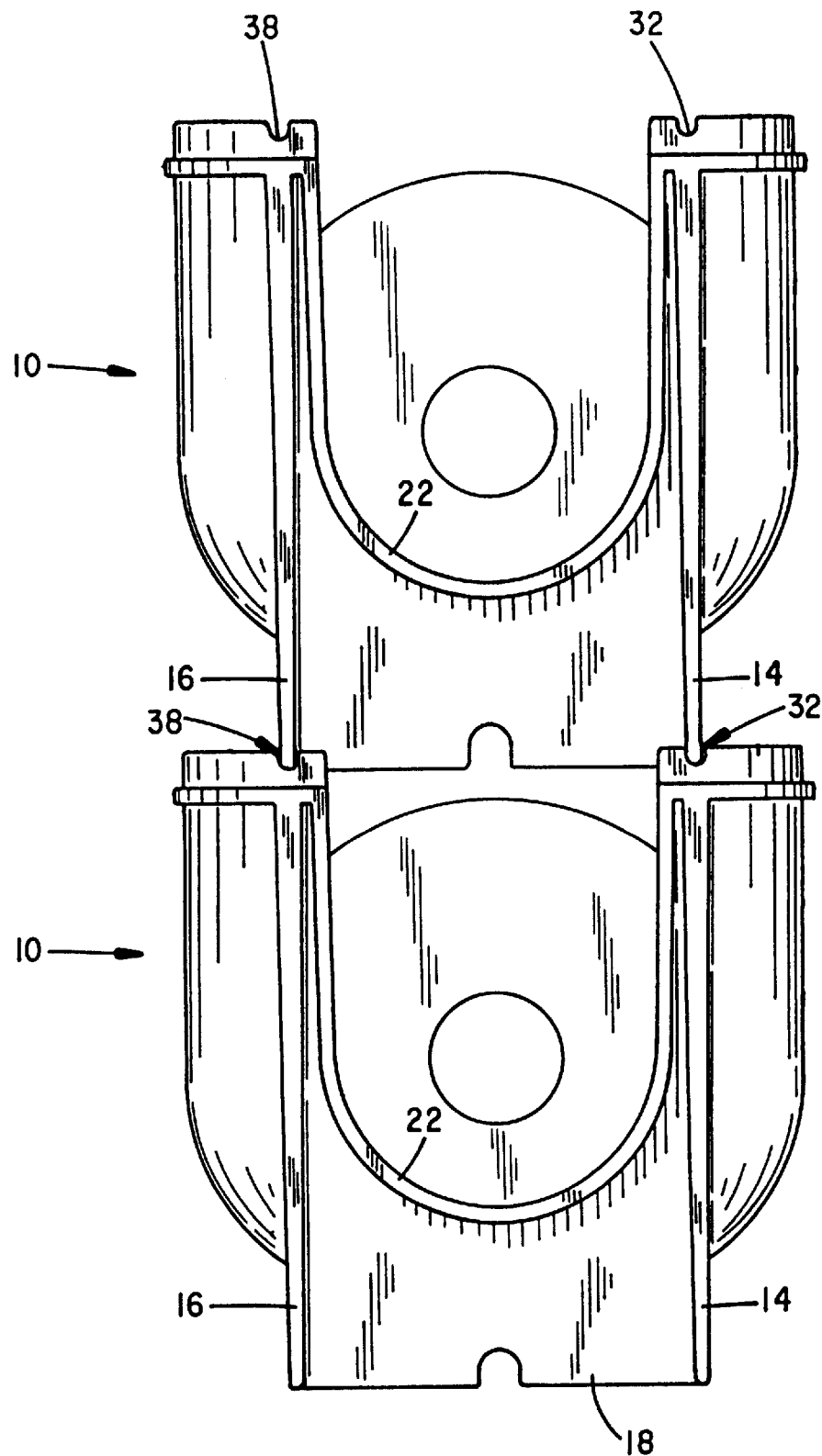
FIG. 15 is a side view illustrating the manner in which the improved disk cassettes of a preferred embodiment of the present invention may be stacked in vertical relation.

A discussion of the general structure of the improved disk cassette 10 will now be set forth with combined reference to FIGS. 1–5. The first end wall 18 extends between a first end of the first and second lateral support walls 14, 16, while the second end wall 20 extends between a second end of the first and second lateral support walls 14, 16. The first end wall 18 may include a lower notch 23 and a generally U-shaped upper aperture bounded by a first ledge 22. In like fashion, the second end wall 20 may include a lower notch 25, a generally U-shaped upper aperture bounded by a second ledge 24, and a tab member 27. A first rim member 26 and a second rim member 28 may be provided for engagement with a cover member (not shown). The first rim member 26 may extend horizontally between a first side of the first and second ledges 22, 24 and may be integrally connected to the first lateral support wall 14, while the second rim member 28 may extend horizontally between a second side of the first and second ledges 22, 24 and is integrally connected to the second lateral support wall 16. A first stacking wall 30 may be disposed immediately above the first rim member 26 and may include a first pair of stacking notches 32, 34. A second stacking wall 36 may be similarly positioned above the second rim member 28 and may include a second pair of stacking notches 38, 40. The first pair of stacking notches 32, 34 are generally co-aligned with the first lateral support wall 14, and the second pair of stacking notches 38, 40 are generally co-aligned with the second lateral support wall 16. With brief reference to FIG. 15, the first and second pair of stacking notches 32, 34, and 38, 40 are dimensioned to engage with the first and second lateral support walls 14, 16, respectively, for stacking multiple disk cassettes 10 in vertical relation on top of one another.

Referring once again to FIGS. 1–5, the disk containment portion 12 includes a first side wall 42, a second side wall 44, a plurality of opposing upper rib members 46, and a plurality of opposing lower rib members 48. The first and second side walls 42, 44 may include a semi-cylindrical lower area 52 and a tapered upper area 50. As will be discussed in greater detail below, the opposing upper and lower rib members 46, 48 are disposed in co-aligned fashion along the interior of each semi-cylindrical lower area 52 so as to support each of a plurality of disks at four different contact regions along the peripheral edge of each disk. With regard to the first side wall 42, the semi-cylindrical lower area 52 may extend in a generally arcuate fashion between the first lateral support wall 14 and the tapered upper area 50, while the tapered upper area 50 may extend in a gradually narrowing fashion between the semi-cylindrical lower area 52 and the first rim member 26. With regard to the second side wall 44, the semi-cylindrical lower area 52 may extend in a generally arcuate fashion between the second lateral support wall 16 and the tapered upper area 50, while the tapered upper area 50 may extend between the semi-cylindrical lower area 52 and the second rim member 28. To compensate for the reduction in wall thickness along each tapered upper area 50, first and second buttress members 54, 56 may be optionally provided along the interior of the tapered upper area 50 for added structural support. Fewer or additional buttress members may be added depending upon the desired level of structural support.

Having described the overall structure of the disk cassette 10 above, a detailed discussion of the disk containment portion 12 will now follow with reference to FIGS. 6–10. With initial reference to FIGS. 6–8, the semi-cylindrical lower area 52 may further include an arcuate lower portion 60 and a straight upper portion 62. The arcuate lower portion 60 extends between a junction line 68 with the second lateral support wall 16 and a junction line 64 with the straight upper portion 62. The straight upper portion 62 extends between a junction line 66 with the tapered upper area 50 and the junction line 64 with the arcuate lower portion 60. The arcuate lower portion 60 and straight upper portion 62 may have a generally uniform thickness, except for a slightly raised ridge portion 70 which extends partially beneath the lower rib members 48. This enlarged view further illustrates the manner in which the wall thickness of the tapered upper area 50 diminishes as it extends away from the straight portion 62 of the semi-cylindrical lower area 52. The upper and lower rib members 46, 48 are spaced in equi-distant and parallel relation along the interior surface of the semi-cylindrical lower area 52 so as to form a plurality of upper and lower engagement grooves 97, 99 therebetween.

The primary distinction between the upper and lower rib members 46, 48 is their overall length along the interior surface of the semi-cylindrical lower area 52. In this regard, each upper rib member 46 may include a first segment 72, a second segment 74, and a third segment 76. The first segment 72 may extend in a ramped fashion from the interior surface of the straight portion 62 for connection with the second segment 74. The second segment 74 may extend in a generally arcuate fashion between the first segment 72 and the third segment 76. The third segment 76 may extend in a ramped fashion from the interior surface of the arcuate lower portion 60 for connection with the second segment 74. Each lower rib member may include a first segment 78, a second segment 80, a third segment 82, a fourth segment 84, and a fifth segment 86. The first segment 78 may extend in a ramped fashion from the interior of the arcuate lower portion 62 for connection with the second segment 80. The second, third, fourth, and fifth segments 80, 82, 84, 86 may extend in series away from the first segment 78 and may follow the approximate curvature of the ridge portion 70 formed along the arcuate lower portion 60.

Figure 9:
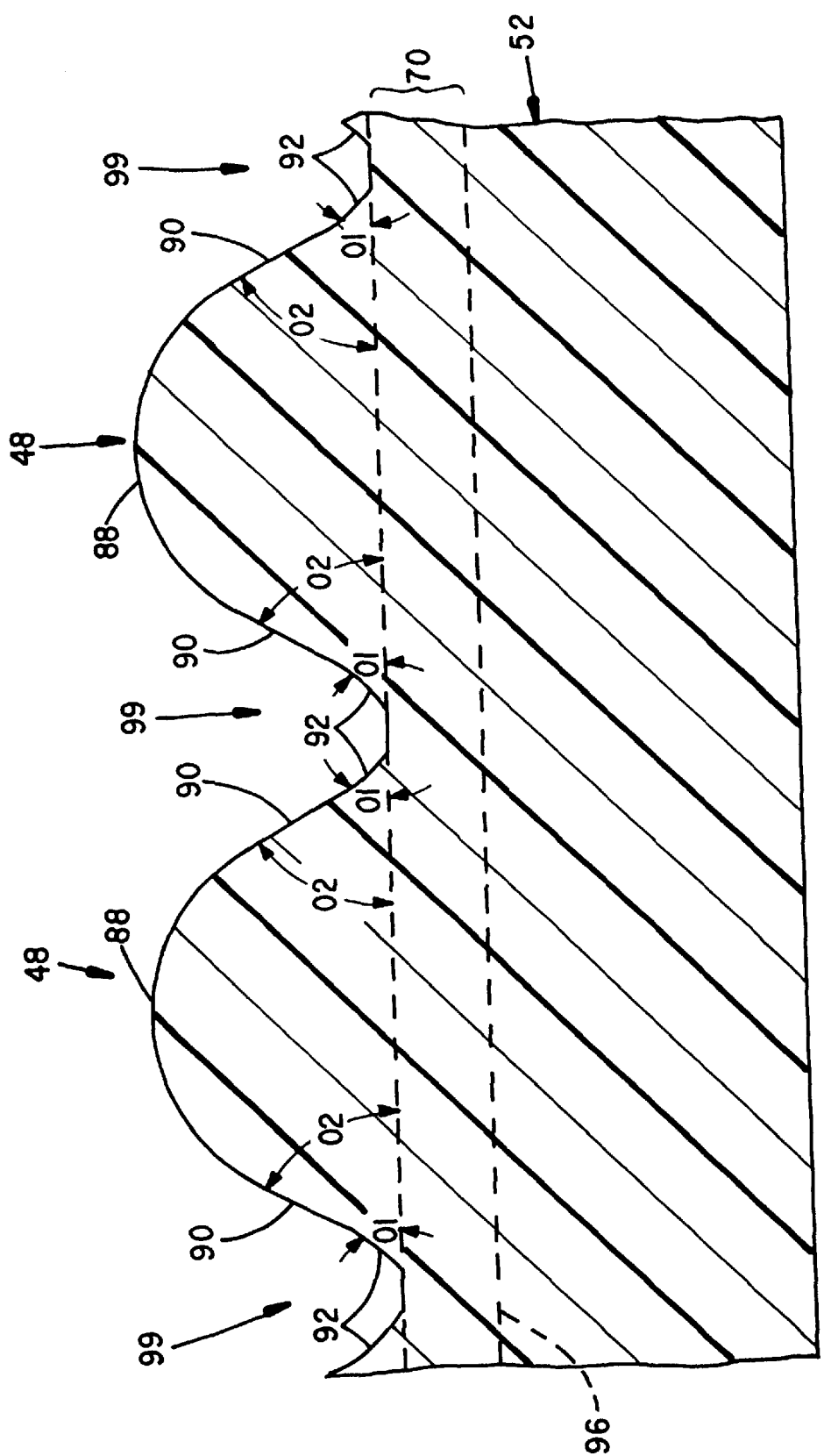
FIG. 9 is an enlarged cross-sectional view of a section of the lower rib members as taken along lines 9—9 in FIG. 5.
Figure 10:
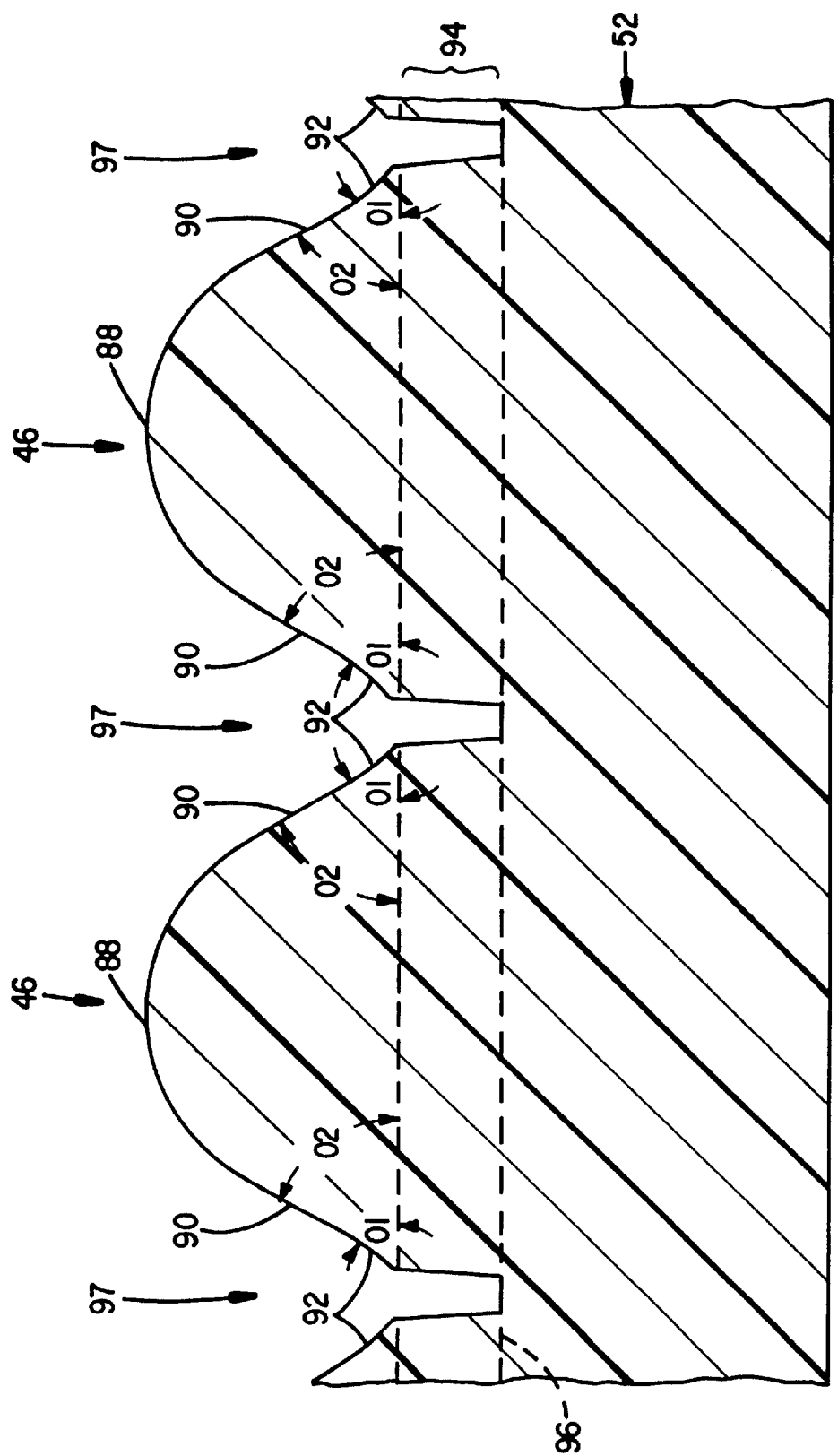
FIG. 10 is an enlarged cross-sectional view of a section of the upper rib members as taken along lines 10—10 in FIG. 5.
Figure 11:
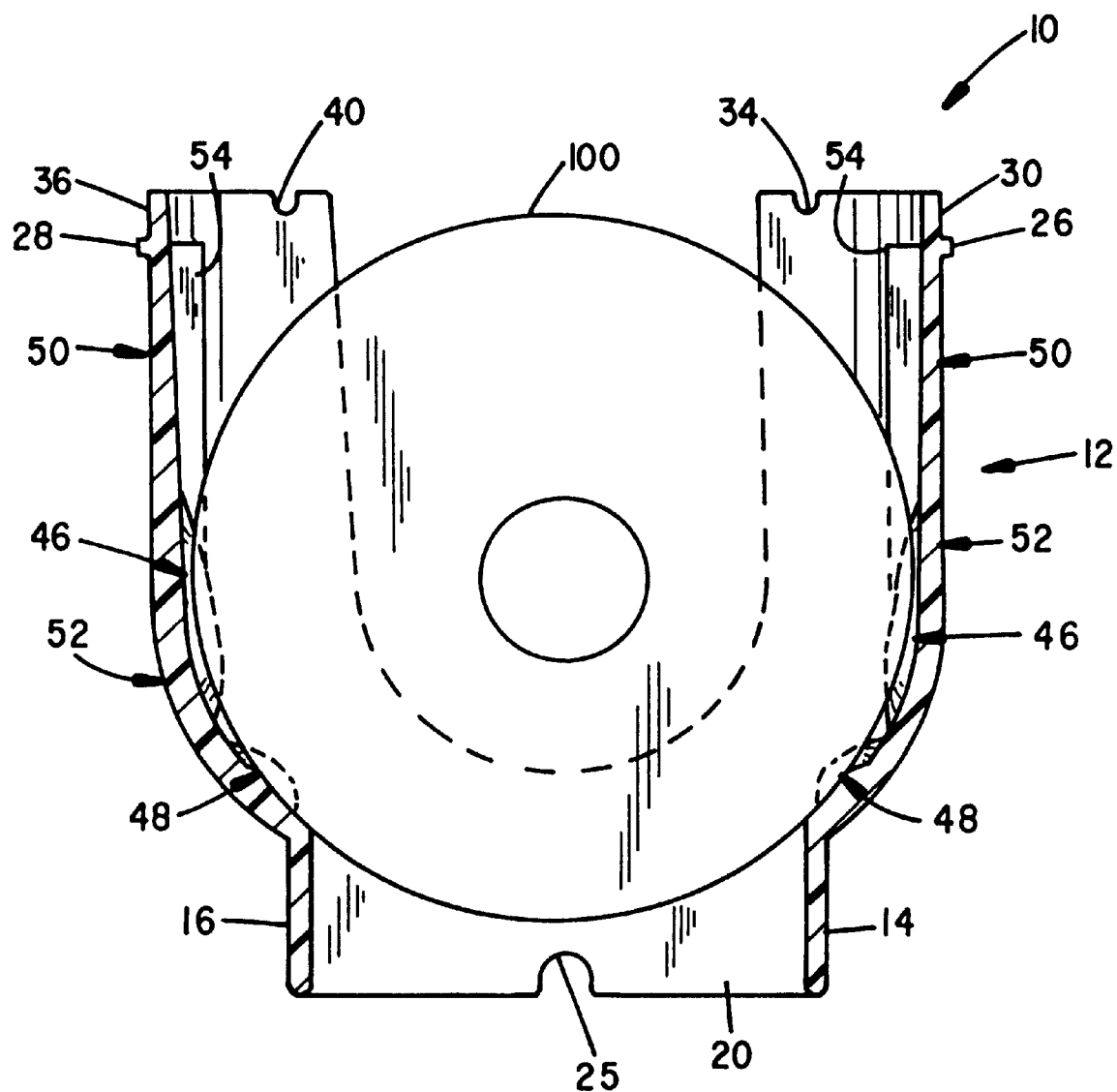
FIG. 11 is a cross-sectional view similar to that of FIG. 5 with a disk disposed within the improved disk cassette of a preferred embodiment of the present invention.

As illustrated in the cross-sectional profiles shown in FIGS. 9 and 10, each segment of the upper and lower rib members 46, 48 is further defined as including a generally curved upper surface 88, a first pair of opposing lateral surfaces 92, and a second pair of opposing lateral surfaces 90. The only difference between the cross-sectional profiles shown in FIGS. 9 and 10 resides in the interspacing between each adjacently located upper and lower rib member 46, 48. With specific reference to FIG. 9, the first pair of opposing lateral surfaces 92 of the lower rib members 48 extend directly from the ridge portion 70 of the arcuate lower portion 60. Turning to FIG. 10, the upper rib members 46 may include a stand-off portion 94 which extends between the interior surface 96 of the semi-cylindrical lower area 52 and the first pair of opposing lateral surfaces 92. Regardless of these differences, the first pair of opposing lateral surfaces 92 of the upper and lower rib members 46, 48 may extend in exactly the same angular fashion, forming a first predetermined angle $\theta1$ relative to the interior surface 96 of the semi-cylindrical lower area 52. In like fashion, the second pair of opposing lateral side surfaces 90 of the upper and lower rib members 46, 48 may extend in the same angular fashion so as to form a second predetermined angle $\theta2$ relative to the interior surface 96 of the semi-cylindrical lower area 52.

Mode of Operation

Figure 13:
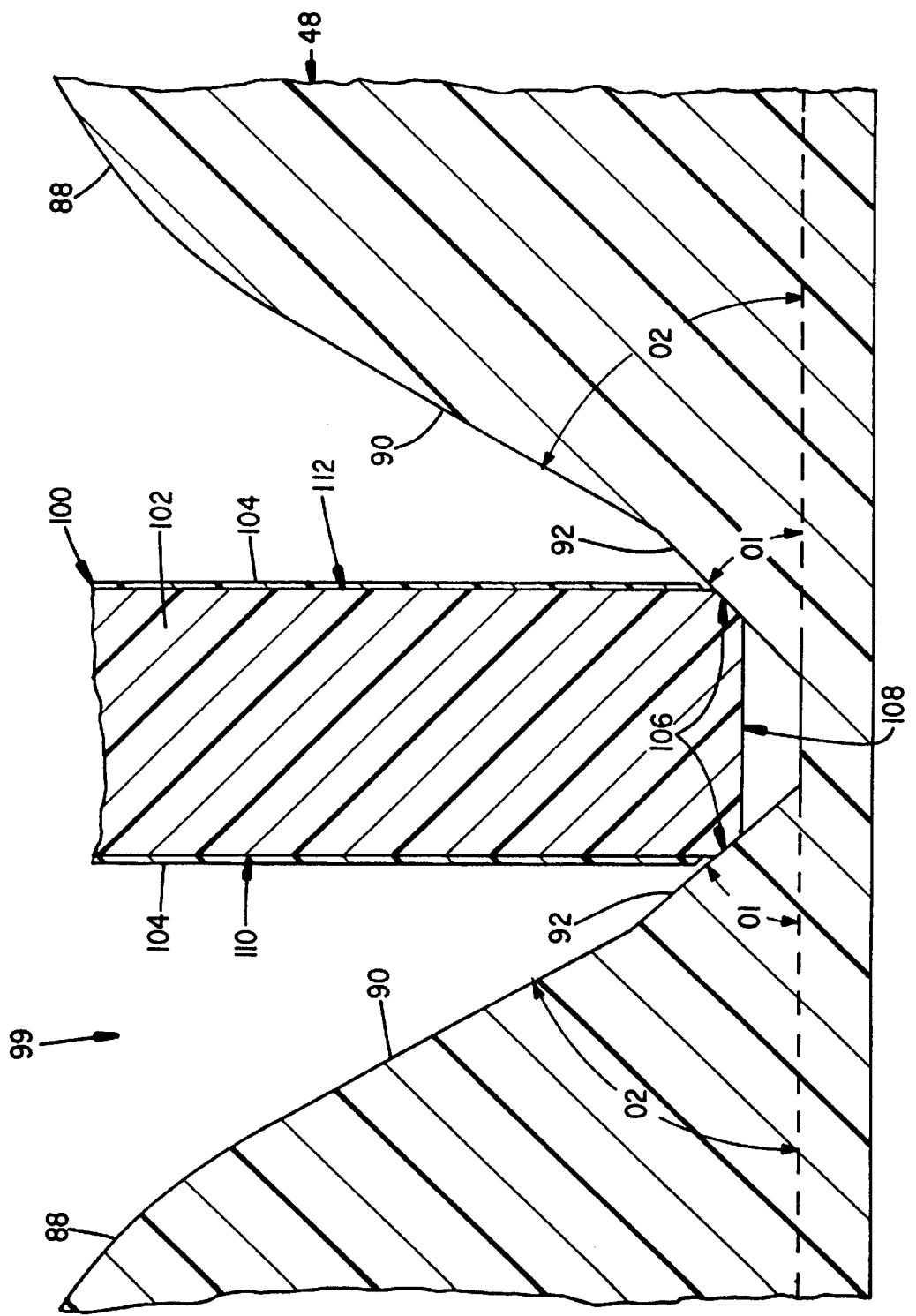
FIG. 13 is a cross-sectional view taken along lines 13—13 in FIG. 12 illustrating the positioning of the disk member between adjacent lower rib members.
Figure 14:
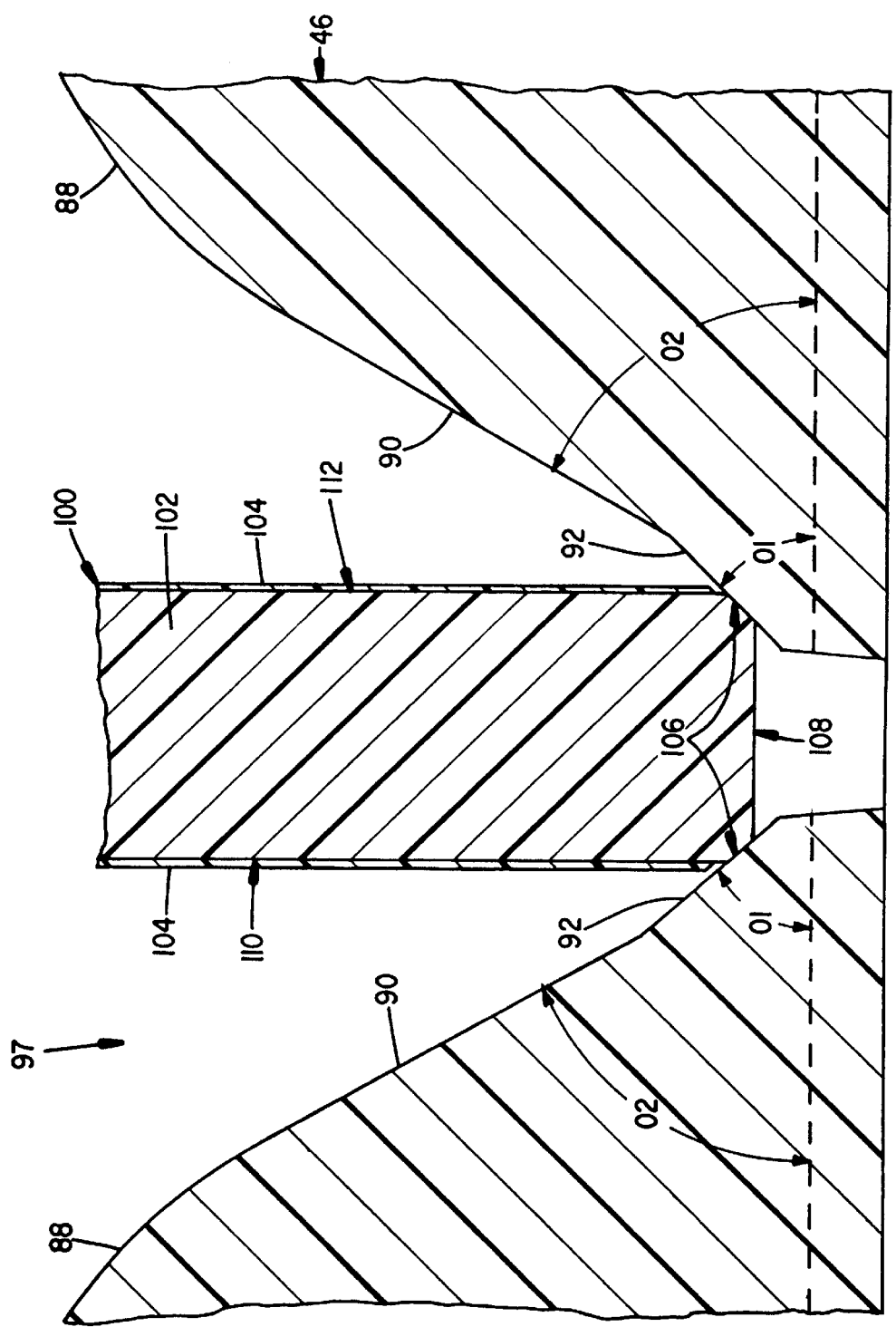
FIG. 14 is a cross-sectional view taken along lines 14—14 in FIG. 12 illustrating the positioning of the disk member between adjacent upper rib members.

The improved disk cassette 10 reduces particulation by: (1) restricting the mobility of each disk member 100 while disposed within the disk cassette 10 so as to minimize disk tilt; and (2) minimizing the amount of contact area between each disk member 100 and the disk cassette 10. As shown in FIGS. 13 and 14 by example, a data storage disk 100 for use with the improved disk cassette 10 of the present invention includes a base member 102 having at least one layer of data storage medium 104 disposed thereon. The base member 102 includes generally planar top and bottom surfaces 110, 112, a principal peripheral edge 108, and opposing chamfered peripheral edges 106 which extend angularly between the top and bottom surfaces 110, 112 and the principal peripheral edge 108. The chamfered peripheral edges 106 are provided as a buffer zone to protect the sensitive recording medium 104 from damage during transportation, storage, and processing.

Figure 12:
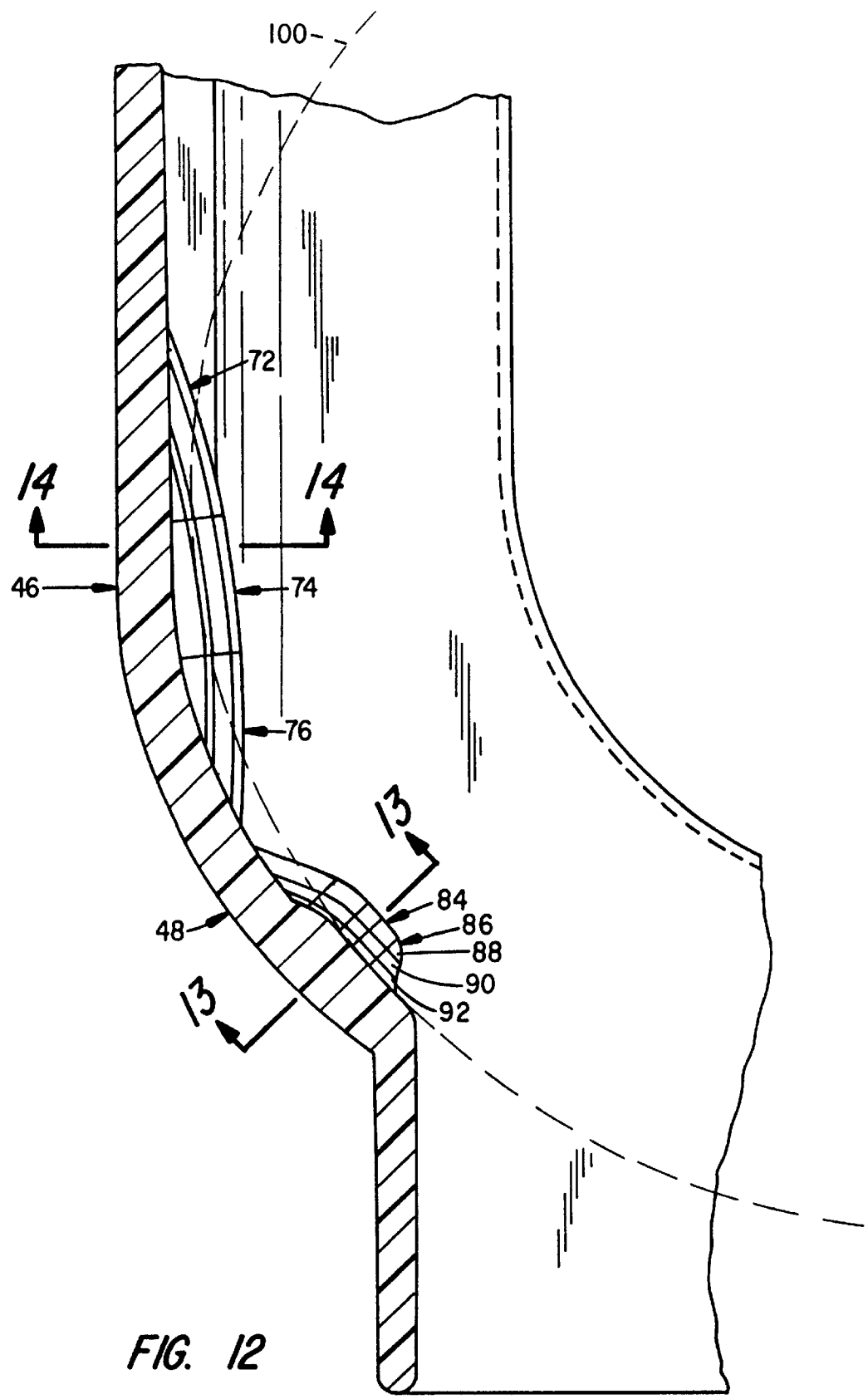
FIG. 12 is an enlarged view of a portion of the cross-sectional view shown in FIG. 11, further illustrating the positioning of the disk within the upper and lower rib member in accordance with a preferred embodiment of the present invention.

In an important aspect of the present invention, the improved disk cassette 10 minimizes disk tilt due to the dual angled cross-sectional profile of the upper and lower rib members 46, 48. To be more specific, the first predetermined angle $\theta1$ establishes flush and radial contact between the chamfered peripheral edges 106 and the first pair of opposing lateral surfaces 92 along a predetermined engagement portion within the upper and lower engagement grooves 97, 99. With reference to FIGS. 12 and 14, the predetermined engagement portion within each upper engagement groove 97 may comprise the second segment 74 of each upper rib member 46. With reference to FIGS. 12 and 13, the predetermined engagement portion of each lower engagement groove 99 may comprise the fourth and fifth segments 84, 86 of each lower rib member 48. The flush contact is accomplished by constructing the first predetermined angle θ1 to approximate the angle of the chamfered peripheral edges 106, while the radial contact is accomplished by constructing each predetermined engagement portion to follow the same arcuate path as the peripheral edge 108 of the disk member 100. Arranged as such, the flush contact along the predetermined engagement portions of each first lateral surface 92 serves to buttress the disk member 100 when the disk cassette 10 is subjected to longitudinal translation, while the radial contact within the upper engagement grooves 99 serves to prohibit the disk member 100 from rocking between the first and second side walls 42, 44 when the disk cassette 10 is subjected to lateral movement.

Disk tilt is also reduced by virtue of the second predetermined angle θ2 of each of the upper and lower rib members 46, 48. More specifically, the second lateral surfaces 90 of each upper and lower rib member 46, 48 are configured such that the second predetermined angle θ2 is substantially steeper than the first predetermined angle θ1 formed by the first lateral surfaces 92. Arranging the second lateral surfaces 90 in this fashion will effectively limit the degree to which each disk member 100 is able to tip or tilt within the upper and lower engagement grooves 97, 99 in the instance that the disk members 100 do experience tilting or tipping when the disk cassette 10 is translated back and forth along the longitudinal axis. In a preferred embodiment, the first predetermined angle θ1 is approximately forty-five (45) degrees and the second predetermined angle θ2 is approximately sixty (60) degrees such that the second lateral surfaces 90 more closely envelope the disk member 100 than do the first lateral surfaces 92. By limiting the degree to which the disks 100 are able to tilt within each engagement groove 97, the second predetermined angle θ2 effectively minimizes the degree to which abrasion occurs between the disk cassette 10 and each disk member 100, thereby reducing particulation.

The improved disk cassette 10 also reduces particulation by minimizing the amount of contact area between the disk cassette 10 and each disk 100. This is accomplished, in a broad sense, by limiting the number of rib members used to support each disk member 100. That is, each disk member 100 is restrained at four different contact regions about the peripheral edge thereof by virtue of the opposing upper and lower rib members 46, 48. This is in sharp distinction to the rib arrangements of the prior art, such as U.S. Patent to Boehm et al. which requires each disk member to be restrained at least eight different contact regions along the peripheral edge. Furthermore, the improved disk cassette 10 of the present invention minimizes the amount of contact area within each of the four contact regions by virtue of the flush and radial contact which exists between the chamfered peripheral edges 106 and the first pair of opposing lateral surfaces 92 along the predetermined engagement portions of the upper and lower engagement grooves 97, 99. More specifically, this flush and radial contact arrangement elevates the principal peripheral edge 108 of each disk member 100 out of contact with the disk cassette 10 such that the only contact which extends therebetween is generally localized to the chamfered peripheral edges 106. As shown in FIGS. 13 and 14, the surface area of the principal peripheral edge 108 is substantially greater than the combined surface area along the chamfered peripheral edges 106. Therefore, by elevating the principal peripheral edge 108 out of contact with the disk cassette 10, the present invention effectively minimizes the amount of contact area between each disk member 100 and the disk cassette 10.

The disk cassette 10 of the present invention is also advantageous in terms of the costs associated with manufacturing and producing the disk cassettes 10. First, as noted above, the dual angle configuration within each engagement groove 97, 99 reduces the degree to disk tilt through the flush and radial contact arrangement between the chamfered peripheral edges 106 and the respective engagement portions along the first lateral surfaces 92, as well as the restraining function of the second predetermined angle θ2. Importantly, this reduction in disk tilt, and thus particulation, is accomplished while using a minimal number of contact regions about the peripheral edge. By minimizing the number of contact regions, and thus rib members, a smaller amount of material is required when manufacturing each improved disk cassette 10. A major reduction in material also stems from the tapered upper area 50 of the first and second side walls 42, 44, which diminishes in width at it extends upwards from the semi-cylindrical lower area 52. A still further reduction in material results from the gaps formed between each stand-off portion 94 of the upper rib members 46. Each such reduction in material lowers the overall cost of manufacture by decreasing the cost of materials, as well as decreasing the cycle time required to cure each disk cassette 10 during manufacture.

In light of the foregoing, then, the improved disk cassette 10 of the present invention overcomes the various drawbacks of the prior art disk cassettes. More particularly, the improved disk cassette 10 effectively restricts the mobility of the disks within the disk cassette so as to reduce abrasion and, thus, particulation. The improved disk cassette 10 of the present invention also has a minimal amount of contact area between each disk member 100 and the disk cassette 10 so as to reduce the propensity for particulation. Furthermore, the improved disk cassette 10 of the present invention is streamlined in terms of the amount of material required for manufacture, thereby decreasing the cost of materials, the cycle time for curing, and overall cost of manufacture.

The various embodiments of the present invention have been described herein in considerable detail in order to comply with the Patent Statutes and to provide those skilled in the art with the information needed to apply the novel principles and to construct and use such specialized components as are required. It is to be understood that the invention can be carried out by specifically different means and that various modifications can be accomplished without departing from the scope of the invention itself.

For example, although the foregoing discussion is directed towards data storage disks, it is to be understood that any number of disk-shaped articles may be employed within the improved disk cassette of the present invention, including but not limited to crystal semiconductor wafer for use in fabricating integrated circuits.

What is claimed is:

1. An improved disk cassette for carrying a plurality of disk-shaped articles comprising:

a first end wall disposed opposite a second end wall;

a first lateral support wall disposed opposite a second lateral support wall; and a disk containment portion disposed between said first and second end walls, said disk containment portion including opposing side walls, each of said opposing side walls including a plurality of rib members disposed in parallel relation along an interior surface of each of said opposing side walls, each of said plurality of rib members having an upper surface extending between a pair of lateral surfaces, each of said pair of lateral surfaces including a lower angular surface extending at a first predetermined angle, and an upper angular surface extending between said lower angular surface and said upper surface at a second predetermined angle, each of said opposing side walls further including a semi-cylindrical area having a first wall thickness and a straight upper area that tapers away from said semi-cylindrical area to a lesser wall thickness, said straight upper area having a plurality of buttress members on its interior to provide added support.

2. The improved disk cassette as set forth in claim 1 and further, said plurality of rib members including a plurality of opposing lower rib members and a plurality of opposing upper rib members, each of said lower angular surfaces of said plurality of lower and upper rib members having a predetermined engagement portion having an arcuate radius which approximates an arcuate radius of each of said plurality of disk-shaped articles.

3. The improved disk cassette as set forth in claim 2 and further, said opposing side walls of said disk containment portion including opposing upper side walls and opposing lower side walls, said plurality of upper and lower rib members being disposed along the interior of said opposing lower side walls.

4. The improved disk cassette as forth in claim 3 and further, each of said opposing upper side walls having a tapered construction which diminishes as said opposing upper side walls extend away from said opposing lower side walls.

5. An improved disk cassette for carrying disk-shaped articles, comprising opposing side walls having a plurality of opposing engagement grooves formed therein, wherein each of said plurality of opposing engagement grooves include a first angled portion and a second angled portion, said first angled portion being adapted to receive a peripheral edge of a disk-shaped article in radial contact, and said second angled portion extending from said first angled portion so as to restrain said disk-shaped article from tilting, each of said opposing side walls also having a semi-cylindrical lower area having a first wall thickness and a straight upper area that tapers to a lesser wall thickness than said first wall thickness, said straight upper area having a plurality of buttress members on its interior to provide added support.

6. The improved disk cassette as set forth in claim 5 and further, each of said plurality of opposing engagement grooves including an upper engagement groove and a lower engagement groove.

7. The improved disk cassette as set forth in claim 6 and further, each of said opposing side walls including an upper side wall and a lower side wall, said plurality of upper and lower engagement grooves being formed along an interior of said opposing lower side walls.

8. The improved disk cassette as set forth in claim 5 and further, said plurality of opposing engagement grooves being further configured to elevate a principal portion of said peripheral edge of said disk-shaped article out of contact with said disk cassette.

* * * * *